United States Patent
Larson

(10) Patent No.: US 7,636,198 B2
(45) Date of Patent: Dec. 22, 2009

(54) BEAMSPLITTER DISPLAY

(75) Inventor: Brent D. Larson, Cave Creek, AZ (US)

(73) Assignee: Honeywell International Inc., Morristown, NJ (US)

(*) Notice: Subject to any disclaimer, the term of this patent is extended or adjusted under 35 U.S.C. 154(b) by 456 days.

(21) Appl. No.: 11/690,001

(22) Filed: Mar. 22, 2007

(65) Prior Publication Data
US 2008/0231689 A1 Sep. 25, 2008

(51) Int. Cl.
G02B 27/14 (2006.01)
G02B 27/10 (2006.01)
G02B 27/22 (2006.01)
G03B 21/00 (2006.01)
G03B 27/32 (2006.01)

(52) U.S. Cl. ........... 359/629; 359/618; 359/638; 359/462; 359/464; 359/472; 345/6; 348/51; 353/7; 353/8; 353/20; 355/22

(58) Field of Classification Search ........... 359/618, 359/629–634, 638, 639, 376, 458, 462, 464, 359/465, 467, 470–472; 345/4–9, 31, 32, 345/589; 348/42, 51, 52, 832; 353/7, 8, 353/10, 20, 31, 94; 355/18, 22, 40
See application file for complete search history.

(56) References Cited

U.S. PATENT DOCUMENTS

| 5,552,840 | A | * | 9/1996 | Ishii et al. .............. 348/751 |
| 5,808,589 | A | * | 9/1998 | Fergason .............. 345/8 |
| 6,486,997 | B1 | * | 11/2002 | Bruzzone et al. ........ 359/247 |
| 6,703,988 | B1 |  | 3/2004 | Fergason |
| 6,779,892 | B2 | * | 8/2004 | Agostinelli et al. ....... 353/7 |
| 7,401,923 | B2 | * | 7/2008 | Fergason ............. 353/8 |
| 2006/0268407 | A1 | * | 11/2006 | Fergason et al. ........ 359/487 |

* cited by examiner

*Primary Examiner*—Loha Ben
(74) *Attorney, Agent, or Firm*—Ingrassia Fisher & Lorenz, P.C.

(57) ABSTRACT

A three dimensional viewing assembly includes a first display, a second display, and a beamsplitter. The first display is for displaying a first image. The second display is for displaying a second image. The beamsplitter is disposed at least partially between the first display and the second display, and is configured to receive, and to optically overlay, the first and second images. The beamsplitter comprises a first surface, a second surface, and a mirror. The first surface at least partially faces the first display, and the second surface at least partially faces the second display. The mirror is disposed between the first surface and the second surface.

20 Claims, 4 Drawing Sheets

BEAMSPLITTER DISPLAY

FIELD OF THE INVENTION

The present invention generally relates to three dimensional viewing assemblies, and more particularly relates to three dimensional viewing assemblies having multiple viewing surfaces and a beamsplitter.

BACKGROUND OF THE INVENTION

Stereoscopic imaging, or three dimensional imaging, allows for the viewing of three dimensional information, including imagery depth and special details, from two or more two-dimensional displays or images. Stereoscopic imaging is typically accomplished by presenting a slightly different image to each eye of the viewer, to thereby capture the imagery depth and spatial details. This can be done in a number of different ways, including the display assembly of FIG. 1 described below.

FIG. 1 depicts a typical stereographic display assembly 100, known in the art, for displaying stereographic or stereoscopic images. The stereographic display assembly 100 includes a first display 102, a second display 104, and a beamsplitter 106, along with optional eyewear 108. The beamsplitter 106 includes an external mirror 110 which is partially reflective and partially transmissive. The first display 102 and the second display 104 display a first image and a second image, respectively, and the beamsplitter 106 overlays the two displayed images, to thereby provide depth perception and a three dimensional viewing experience.

The stereographic display assembly 100, and similar stereographic devices, can be effective in displaying stereographic images, and can result in improvements in performing various tasks, among various other potential benefits. However, the depicted stereographic display assembly 100, and other stereographic devices, can also lead to some less than optimal results. For example, refraction from the beamsplitter 106 can divert the line of sight from one of the two displays 102 or 104, thereby resulting in what is sometimes referred to as "dipvergence".

Dipvergence occurs when, as shown in FIG. 1, the line of sight for the second display 104 is shifted vertically, relative to the line of sight for the matching portion of the first display 102, by one or more delta values 112. This dipvergence can result in viewer fatigue and discomfort, and can potentially interfere with the benefits of using a stereographic display assembly. Additionally, the delta values 112 typically vary at different points along the second display 104 as well as with different vantage points or positions for viewing the display. For example, and, as also shown in FIG. 1, a first delta value 112(A) near the top of the second display 104 may be larger than a second delta value 112(B) near the bottom of the second display 104. Accordingly, a first order vertical shift would not resolve the dipvergence problem. Positioning the mirror 110 on the opposite side of the beamsplitter 106 would alter the diagram somewhat, but would also not resolve the dipvergence problem. Moreover, in high vibration environments such as aircraft, thicker beamsplitters 106 may be used, which can lead to increased dipvergence, particularly in stereographic display assemblies in which the beamsplitter 106 is a relatively short distance from the first and second displays 102, 104.

Accordingly, it is desirable to have an improved stereographic device for three dimensional viewing with decreased dipvergence, and preferably with decreased dipvergence through the entire displays. It is also desirable to have such an improved stereographic device that can be used in high vibration environments such as aircraft, for example with a relatively thick beamsplitter, and with stereographic display assemblies in which the beamsplitter is a relatively short distance from the displays. The present invention addresses one or more of these needs. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for a three dimensional viewing assembly. In one embodiment, and by way of example only, the three dimensional viewing assembly comprises a first display, a second display, and a beamsplitter. The first display is for displaying a first image. The second display is for displaying a second image. The beamsplitter is disposed at least partially between the first display and the second display, and is configured to receive, and to optically overlay, the first and second images. The beamsplitter comprises a first surface, a second surface, and a mirror. The first surface at least partially faces the first display, and the second surface at least partially faces the second display. The mirror is disposed between the first surface and the second surface.

In another embodiment, and by way of example only, the three dimensional viewing assembly comprises a first display, a second display, and a beamsplitter. The first display is for displaying a first image. The second display is for displaying a second image. The beamsplitter is disposed at least partially between the first display and the second display, and is configured to receive, and to optically overlay, the first and second images. The beamsplitter comprises a first beamsplitter component, a second beamsplitter component, and a mirror. The first beamsplitter component has a first surface at least partially facing the first display, and a second surface, at least partially facing the second display. The second beamsplitter component is disposed between the first beamsplitter component and the second display. The second beamsplitter component has a first surface, at least partially facing the first beamsplitter component, and a second surface, at least partially facing the second display. The mirror is disposed between the first surface of the first beamsplitter component and the second surface of the second beamsplitter component.

In yet another embodiment, and by way of example only, the three dimensional viewing assembly comprises a first display, a second display, and a beamsplitter assembly. The first display is for displaying a first image. The second display is for displaying a second image. The beamsplitter assembly is disposed at least partially between the first display and the second display, and is configured to receive, and to optically overlay, the first and second images. The beamsplitter assembly comprises a beamsplitter and a controller. The controller is coupled to at least one of the first display or the second display, and is configured to stretch or compress at least a portion of the first image or the second image.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 2:
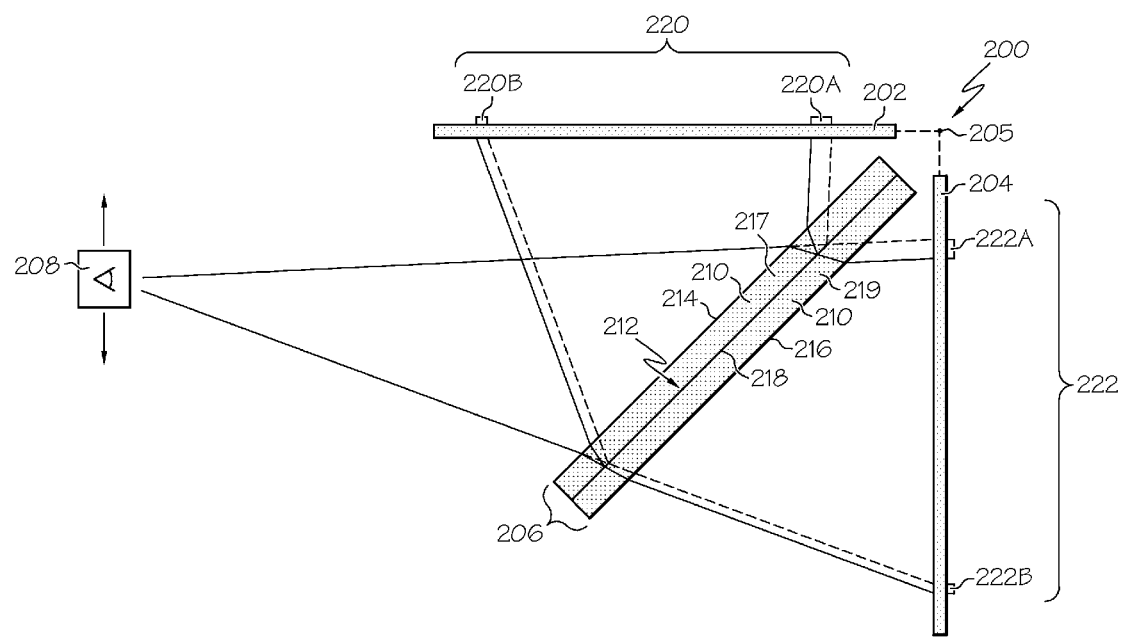
FIG. 2 is a schematic depiction of a first improved beamsplitter stereographic display assembly, with a beamsplitter having first and second surfaces and a mirror therebetween.

FIG. 2 depicts a first improved beamsplitter stereographic display assembly (first improved display assembly) 200. As shown in FIG. 2, the first improved display assembly 200 includes a first display 202, a second display 204, and a beamsplitter 206. The first improved display assembly 200 may be used in conjunction with optional eyewear 208.

The first display 202 is adapted to display a first image (not depicted), and the second display 204 is adapted to display a second image (not depicted). In the depicted embodiment, the first and second displays 202, 204 are disposed perpendicular to one another. However, this may vary in other embodiments. For reference purposes only, the depicted embodiment includes an imaginary intersection point 205, at which the first and second displays 202, 204 would form a right angle if extended to the intersection point 205.

In a preferred embodiment, the focus position of the first display 202 is at least substantially identical to that of the second display 204. The apparent focus position of the displayed image is preferably within six feet, and is most preferably within three feet. In addition, preferably the first and second displays 202, 204 each have non-depicted centers that are substantially fixed and that are substantially equidistant from a non-depicted center of the beamsplitter 206, and the first and second displays 202, 204 are disposed in relatively close proximity to one another. This may vary in certain embodiments.

The first and second displays 202, 204 may include one or more of various different types of displays, for example, plasma displays, liquid crystal displays (LCD), cathode ray tube (CRT) displays, projection displays, and organic light-emitting diode (OLED) displays, among various other different types of displays. Regardless of the particular types of displays used, the first and second displays 202, 204 are preferably identical, or at least substantially identical. The optional eyewear 208 may be worn by a non-illustrated user and used in viewing a stereoscopic image displayed by the first and second displays 202, 204.

The beamsplitter 206 is disposed at least partially between the first display 202 and the second display 204, and is configured to receive, and to optically overlay, the first and second images. The beamsplitter 206 includes a substrate 210 and an internal mirror 212. In the depicted embodiment, the beamsplitter 206 is at least substantially flat; however, this may vary in certain embodiments. The substrate 210 is made of glass in a preferred embodiment; however, this may vary, and other transparent media can be used. Regardless of the particular material from which it is made, the substrate 210 has a first surface 214 and a second surface 216. The first surface 214 at least partially faces the first display 202, and the second surface 216 at least partially faces the second display 204.

The internal mirror 212 is disposed between the first surface 214 and the second surface 216. Moreover, the internal mirror 212 is preferably laminated between a first portion 217 of the substrate 210, which is relatively closer to the first surface 214, and a second portion 219 of the substrate 210, which is relatively closer to the second surface 216. Preferably, the internal mirror 212 is at least substantially parallel to both the first surface 214 and the second surface 216, as depicted in FIG. 2. In addition, also as depicted in FIG. 2, the internal mirror 212 is preferably disposed along a centerline 218 that is between the first and second portions 217, 219 of the substrate 210, and that is equidistant between the first and second surfaces 214, 216. With this configuration, the second portion 219 acts as a compensating element for the first portion 217, to thereby counteract any shift in the first portion 217. The internal mirror 212 is preferably greater than 0.2 mm, and most preferably greater than 1 mm, from each of the first and second surfaces 214, 216, and is preferably equidistant from the first and second surfaces 214, 216. In addition, the first and second surfaces 214, 216 preferably each include one or more antireflection coatings to further improve performance.

Accordingly, in a preferred embodiment in which the first and second portions 217, 219 are made of the same type of material, this will equalize optical shifts for the first and second displays 202, 204, as described below. However, in embodiments where the first and second portions 217, 219 are made of different types of material, then the internal mirror 212 would preferably be positioned closer to either the first surface 214 or the second surface 216, depending on the respective refractive indices of the materials in the first and second portions 217, 219. The internal mirror 212 can be one of various different types of partially transmitting mirrors.

Figure 1:
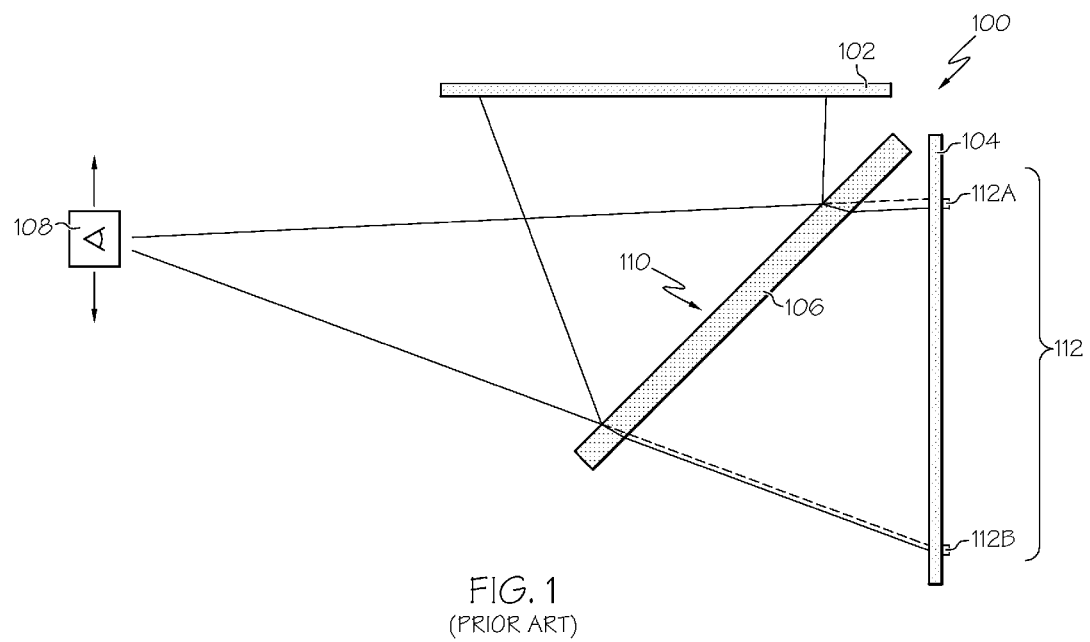
FIG. 1 is a schematic depiction of a beamsplitter stereographic display assembly from the prior art.

As shown in FIG. 2, the line of sight for the first display 202 is shifted by first display delta values 220 that are similar or identical to corresponding second delta values 222 representing shifts in the line of sight for the second display 204. For example, a depicted pair of corresponding first and second delta values 220A and 222A, which are equidistant from and relatively near the intersection point 205, are equal to one another. Similarly, another depicted pair of corresponding first and second delta values 220B and 222B, which are equidistant from the intersection point 205 at a relatively farther distance from the intersection point 205 (as compared with the previously-mentioned other first and second delta values 220A and 220B), are also equal to one another. Accordingly, dipvergence is at least reduced, and is preferably eliminated. This is very beneficial in the case of high vibration environments. In making beamsplitter 206 thicker and therefore more vibration resistant, as compared with beamsplitter 106 in FIG. 1, the delta values 222A and 222B are noticeably larger than corresponding delta values 112A and 112B of FIG. 1, Positioning the beamsplitter internally to beamsplitter 206 effectively compensates for this increase in the present embodiment.

Figure 3:
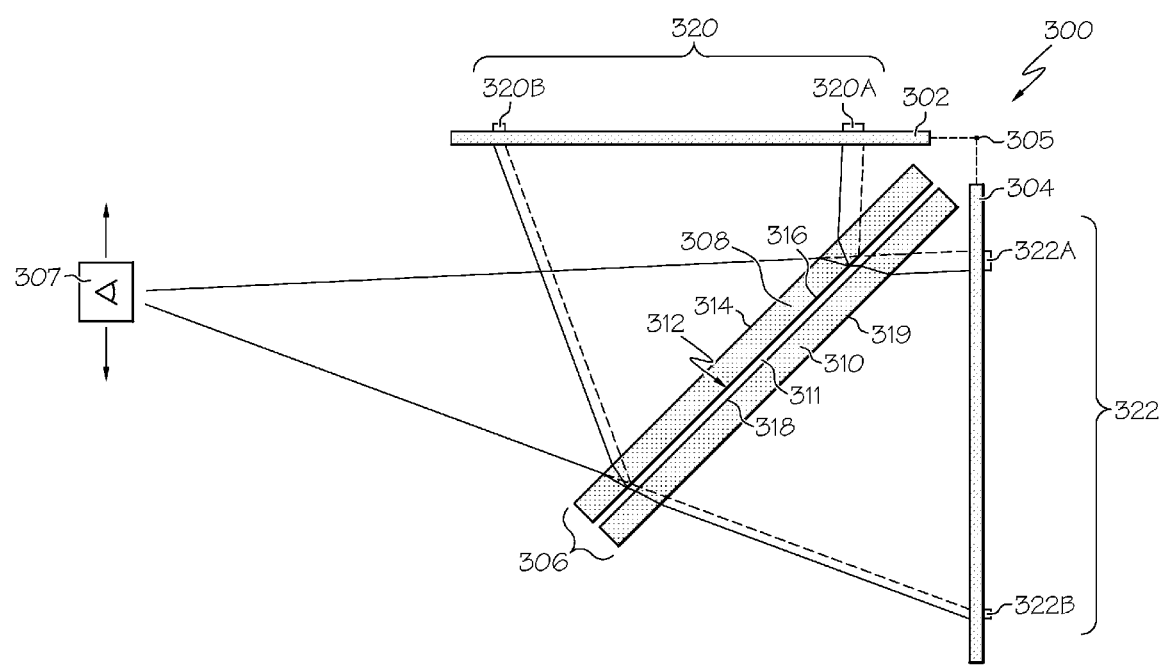
FIG. 3 is a schematic depiction of a second improved beamsplitter stereographic display assembly, with a beamsplitter having first and second beamsplitter components and a mirror therebetween.

Turning now to FIG. 3, a second improved beamsplitter stereographic display assembly (second improved display assembly) 300 is depicted. As shown in FIG. 3, the second improved display assembly 300 includes a first display 302, a second display 304, and a beamsplitter 306. The second improved display assembly 300 may be used in conjunction with optional eyewear 307.

The first display 302 is adapted to display a first image (not depicted), and the second display 304 is adapted to display a second image (not depicted). Similar to the first improved display assembly 200 of FIG. 2, in the depicted embodiment of FIG. 3 the first and second displays 302, 304 are disposed perpendicular to one another, although this may vary in other embodiments. For reference purposes only, the depicted embodiment includes an imaginary intersection point 305, at which the first and second displays 302, 304 would form a right angle if extended to the intersection point 305. Also similar to the first improved display assembly 200 of FIG. 2, the first and second displays 302, 304 of the second improved display assembly 300 of FIG. 3 may include one or more of various different types of displays, for example, plasma displays, liquid crystal displays (LCD), cathode ray tube (CRT) displays, projection displays, and organic light-emitting diode (OLED) displays, among various other different types of displays, but the first and second displays 302, 304 are preferably identical, or at least substantially identical.

In a preferred embodiment, the focus position of the first display 302 is at least substantially identical to that of the second display 304. The apparent focus position of the displayed image is preferably within six feet, and is most preferably within three feet. In addition, preferably the first and second displays 302, 304 each have non-depicted centers that are substantially fixed and that are substantially equidistant from a non-depicted center of the beamsplitter 306, and the first and second displays 302, 304 are disposed in relatively close proximity to one another. This may vary in certain embodiments. The optional eyewear 307 may be worn by a non-illustrated user and used in viewing a stereoscopic image displayed by the first and second displays 302, 304.

The beamsplitter 306 is disposed at least partially between the first display 302 and the second display 304, and is configured to receive, and to optically overlay, the first and second images. The beamsplitter 306 includes a first beamsplitter component 308, a second beamsplitter component 310, an air gap 311, and an internal mirror 312. In the depicted embodiment, the beamsplitter 306 is at least substantially flat; however, this may vary in certain embodiments.

The first beamsplitter component 308 has a first surface 314 and a second surface 316. The first surface 314 of the first beamsplitter component 308 at least partially faces the first display 302. The second surface 316 of the first beamsplitter component 308 at least partially faces the second beamsplitter component 310 and the second display 304. The first beamsplitter component 308 is made of glass in a preferred embodiment; however, this may vary, and other transparent media can be used.

The second beamsplitter component 310 is disposed between the first beamsplitter component 308 and the second display 304. As will be described further below, the second beamsplitter component 310 acts as a compensating element for the first beamsplitter component 308. The second beamsplitter component 310 has a first surface 318 and a second surface 319. The first surface 318 of the second beamsplitter component 310 at least partially faces the first beamsplitter component 308, and the second surface 319 of the second beamsplitter component 310 at least partially faces the second display 304.

The second beamsplitter component 310 is preferably made of the same material as the first beamsplitter component 308. For example, in one preferred embodiment, the first and second beamsplitter components 308, 310 are both made of glass. However, in other embodiments, the first and second beamsplitter components 308, 310 may instead be made from one or more identical transparent materials, or the first beamsplitter component 308 may be made from one or more different transparent materials than the second beamsplitter component 310.

In a preferred embodiment in which the first and second beamsplitter components 308, 310 are made of the same material, the thicknesses of the first and second beamsplitter components 308, 310 are equal, to thereby equalize optical shifts for the first and second displays 302, 304, as described further below. In other words, in this preferred embodiment, the distance between the first and second surfaces 314, 316 of the first beamsplitter component 308 is approximately equal to the distance between the first and second surfaces 318, 319 of the second beamsplitter component 310. However, in embodiments where the first and second beamsplitter components 308, 310 are made of different materials, then preferably one of the first and second beamsplitter components 308, 310 has a greater thickness than the other, depending on the respective refractive indices of the materials in the first and second beamsplitter components 308, 310.

The air gap 311 is disposed between the first and second beamsplitter components 308, 310. In certain embodiments, multiple air gaps 311 may be implemented. With this configuration, the air gaps 311 divide the beamsplitter 306 into the above-referenced first and second beamsplitter components 308, 310, and to thereby provide another device for decreasing dipvergence, as described further below. It will be appreciated that the air gaps 311 may include gaps containing one or more other materials, such as various gases, liquids, gels, vacuum, and/or various other transparent materials.

The internal mirror 312 is disposed between the first surface 314 of the first beamsplitter component 308 and the second surface 319 of the second beamsplitter component 310. In the depicted embodiment of FIG. 3, the internal mirror 312 is a partially reflective thin film which has been vacuum deposited using established methods on the second surface 316 of the first beamsplitter component 308. However, this may vary in other embodiments. For example, the internal mirror 312 may alternatively be laminated or otherwise disposed against the first surface 318 of the second beamsplitter component 310, or may be disposed anywhere between the first and second surfaces 314, 316 of the first beamsplitter component 308, or anywhere between the first and second surfaces 318, 319 of the second beamsplitter component 310.

Preferably, the internal mirror 312 is at least substantially parallel to the first and second surfaces 314, 316 of the first beamsplitter component 308, and to the first and second surfaces 318, 319 of the second beamsplitter component 310. The internal mirror 312 can be one of various different types of partially transmitting mirrors, including but not limited to thin metallic films, multilayer dielectric films, or reflective polarizing films. The internal mirror 312 is preferably greater than 0.2 mm, and most preferably greater than 1 mm, from each of the first and second surfaces 314, 316, and is preferably equidistant from the first and second surfaces 314, 316. In addition, the first and second surfaces 314, 316 preferably each include one or more antireflection coatings to further improve performance.

As shown in FIG. 3, because the second beamsplitter component 310 compensates for the first beamsplitter component 308, the line of sight for the first display 302 is shifted by first display delta values 320 that are similar or identical to corresponding second delta values 322 representing shifts in the line of sight for the second display 304. For example, a depicted pair of corresponding first and second delta values 320A and 322A, which are equidistant from and relatively near the intersection point 305, are equal to one another. Similarly, another depicted pair of corresponding first and second delta values 320B and 322B, which are equidistant from the intersection point 305 at a relatively farther distance from the intersection point 305 (as compared with the previously-mentioned other first and second delta values 320A and 322A), are also equal to one another. Accordingly, dipvergence is at least reduced, and is preferably eliminated, in this embodiment as well.

Figure 4:
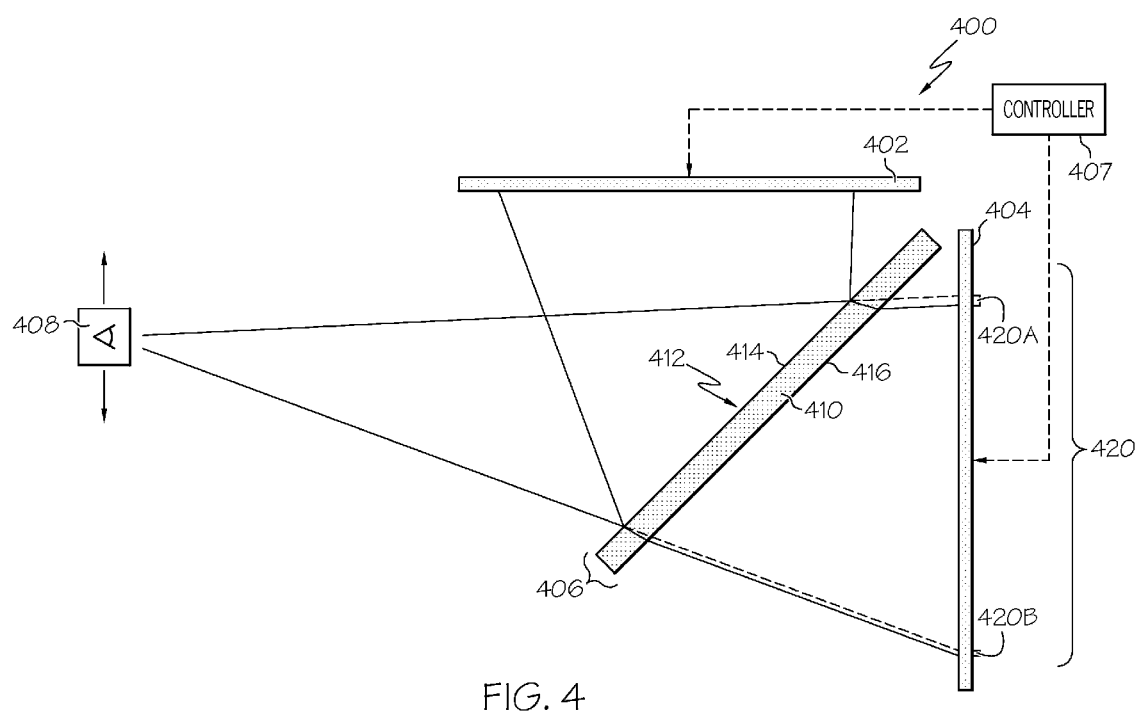
FIG. 4 is a schematic depiction of a third improved beamsplitter stereographic display assembly, with a beamsplitter and a controller.

Turning now to FIG. 4, a third improved beamsplitter stereographic display assembly (third improved display assembly) 400 is depicted. As shown in FIG. 4, the third improved display assembly 400 includes a first display 402, a second display 404, a beamsplitter 406, and a controller 407. The third improved display assembly 400 may be used in conjunction with optional eyewear 408.

The first display 402 is adapted to display a first image (not depicted), and the second display 404 is adapted to display a second image (not depicted). Similar to the first and second improved display assembly assemblies 200, 300 of FIGS. 2 and 3, in the depicted embodiment of FIG. 4 the first and second displays 402, 404 are disposed perpendicular to one another, although this may vary in other embodiments. Also similar to the first and second improved display assembly assemblies 200, 300 of FIGS. 2 and 3, the first and second displays 402, 404 of the third improved display assembly 400 of FIG. 4 may include one or more of various different types of displays, for example, plasma displays, liquid crystal displays (LCD), cathode ray tube (CRT) displays, projection displays, and organic light-emitting diode (OLED) displays, among various other different types of displays, but the first and second displays 402, 404 are preferably identical, or at least substantially identical.

In a preferred embodiment, the focus position of the first display 402 is at least substantially identical to that of the second display 404. The apparent focus position of the displayed image is preferably within six feet, and is most preferably within three feet. In addition, preferably the first and second displays 402, 404 each have non-depicted centers that are substantially fixed and that are substantially equidistant from a non-depicted center of the beamsplitter 406, and the first and second displays 402, 404 are disposed in relatively close proximity to one another. This may vary in certain embodiments. The optional eyewear 408 may be worn by a non-illustrated user and used in viewing a stereoscopic image displayed by the first and second displays 402, 404.

The beamsplitter 406 is disposed at least partially between the first display 402 and the second display 404, and is configured to receive, and to optically overlay, the first and second images. The beamsplitter 406 includes a substrate 410 and a mirror 412. In the depicted embodiment, the beamsplitter 406 is at least substantially flat; however, this may vary in certain embodiments. The substrate 410 is made of glass in a preferred embodiment; however, this may vary, and other transparent media can be used. Regardless of the particular material from which it is made, the substrate 410 has a first surface 414 and a second surface 416. The first surface 414 at least partially faces the first display 402, and the second surface 416 at least partially faces the second display 404.

In the depicted embodiment, the mirror 412 is an external mirror laminated against the first surface 414. However, this may vary in other embodiments. For example, the mirror 412 may alternatively be laminated or otherwise disposed adjacent to the second surface 416, or between the first and second surfaces 414, 416. Preferably, the mirror 412 is at least substantially parallel to the first and second surfaces 414, 416. The mirror 412 can be one of various different types of partially transmitting mirrors.

The controller 407 is coupled to at least one of the first display 402 or the second display 404. The controller 407 is configured to stretch and/or compress at least a portion of the first image and/or the second image, to thereby decrease or eliminate dipvergence. Specifically, the controller 407 warps the first and/or second images before they appear on the first and/or second displays 402, 404, respectively, to decrease or eliminate vertically shifts required in viewing one or both of the first or second displays 402, 404. Preferably, the controller 407 stretches or compresses a portion of the first image differently than a corresponding portion of the second image (or only stretches or compresses one of the two images) in order to reduce dipvergence in the simultaneous display of the first and second images on the first and second displays 402, 404, respectively.

For example, in the depicted embodiment of FIG. 4, the controller 407 may variably stretch the second image for various points along the second display 404 to eliminate delta values 420 representing such vertical shifts in viewing the second display 404. In this depicted embodiment, the controller 407 preferably stretches portions of the second image to a relatively greater extent for points closer to the top of the second display 404 (for example to mitigate or eliminate a relatively larger delta value 420A), and to a relatively lesser extent for points closer to the bottom of the second display 404 (for example to mitigate or eliminate a relatively smaller delta value 420B). Accordingly, the controller 407 can be used to reduce or eliminate dipvergence that varies across a display, something that could not otherwise be accomplished in such a display for example by a first order vertical shift up or down.

Alternatively, in the depicted embodiment of FIG. 4, the controller 407 could accomplish a similar result by variably shrinking the first image for various points along the first display 402. Similarly, in other embodiments, the controller 407 may reduce or eliminate dipvergence by variably stretching and/or shrinking one or both of the first and second images different from one another. Additionally, it will be appreciated that the controller 407 can similarly be used to warp images, and thereby decrease or eliminate dipvergence, in various other different types of displays, for example featuring different types of beamsplitters 406 and/or mirrors 412, and/or different configurations thereof.

The first, second, and third improved display assembly assemblies 200, 300, and 400 allow for improved three dimensional viewing with little or no dipvergence. This can thereby result in greater comfort for the viewer, and can enable the viewer to use the display assemblies for longer periods of time and/or with increased utility. This can thereby result in improvements in performing tasks and other benefits. Furthermore, the first, second, and third improved display assembly assemblies 200, 300, and 400 are well suited for implementation in high vibration environments such as aircraft, and with relatively thick beamsplitters, and with stereographic display assemblies in which the beamsplitter is a relatively short distance from the displays. While control of dipvergence is a key advantage of the described embodiments, additional advantages are also realized. As an example, convergence errors associated with differential deltas in the orthogonal axis are also reduced in the embodiments shown in FIGS. 2-3, and the embodiment of FIG. 4 can be extended to include compensation for the orthogonal axis as well.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A three dimensional viewing assembly comprising:
a first display for displaying a first image;
a second display for displaying a second image; and
a beamsplitter disposed at least partially between the first display and the second display, the beamsplitter configured to receive, and to optically overlay, the first and second images, the beamsplitter comprising:
a first surface at least partially facing the first display;
a second surface at least partially facing the second display; and
a mirror disposed between the first surface and the second surface.

2. The three dimensional viewing assembly of claim 1, wherein:
the mirror is at least substantially parallel to both the first surface and the second surface.

3. The three dimensional viewing assembly of claim 1, wherein the mirror is approximately equidistant from the first surface and the second surface.

4. The three dimensional viewing assembly of claim 1, wherein the mirror is laminated between a first portion of the beamsplitter, which is relatively closer to the first surface, and a second portion of the beamsplitter, which is relatively closer to the second surface.

5. The three dimensional viewing assembly of claim 1, wherein the beamsplitter is at least substantially flat.

6. A three dimensional viewing assembly comprising:
a first display for displaying a first image;
a second display for displaying a second image; and
a beamsplitter disposed at least partially between the first display and the second display, the beamsplitter configured to receive, and to optically overlay, the first and second images, the beamsplitter comprising:
a first beamsplitter component having a first surface, at least partially facing the first display, and a second surface, at least partially facing the second display; and
a second beamsplitter component disposed between the first beamsplitter component and the second display, the second beamsplitter component having a first surface, at least partially facing the first beamsplitter component, and a second surface, at least partially facing the second display; and
a mirror disposed between the first surface of the first beamsplitter component and the second surface of the second beamsplitter component.

7. The three dimensional viewing assembly of claim 6, further comprising:
an air gap disposed between the second surface of the first beamsplitter component and the first surface of the second beamsplitter component.

8. The three dimensional viewing assembly of claim 6, wherein the mirror is disposed against the second surface of the first beamsplitter component.

9. The three dimensional viewing assembly of claim 6, wherein the mirror is disposed against the first surface of the second beamsplitter component.

10. The three dimensional viewing assembly of claim 6, wherein the mirror is disposed between the first and second surfaces of the first beamsplitter component.

11. The three dimensional viewing assembly of claim 6, wherein the mirror is disposed between the first and second surfaces of the second beamsplitter component.

12. The three dimensional viewing assembly of claim 6, wherein the distance between the first and second surfaces of the first beamsplitter component is approximately equal to the distance between the first and second surfaces of the second beamsplitter component.

13. The three dimensional viewing assembly of claim 6, wherein the beamsplitter is at least substantially flat.

14. A three dimensional viewing assembly comprising:
a first display for displaying a first image;
a second display for displaying a second image; and
a beamsplitter assembly disposed at least partially between the first display and the second display, the beamsplitter assembly configured to receive, and to optically overlay, the first and second images, the beamsplitter assembly comprising:
a beamsplitter; and
a controller coupled to at least one of the first display or the second display, the controller configured to stretch or compress at least a portion of the first image or the second image.

15. The three dimensional viewing assembly of claim 14, wherein the controller stretches or compresses a portion of the first image differently than a corresponding portion of the second image in order to reduce dipvergence in the simultaneous display of the first and second images on the first and second displays, respectively.

16. The three dimensional viewing assembly of claim 14, wherein the beamsplitter comprises:
a first surface, at least partially facing the first display;
a second surface, at least partially facing the second display; and
a mirror.

17. The three dimensional viewing assembly of claim 16, wherein the mirror is adjacent to the first surface.

18. The three dimensional viewing assembly of claim 16, wherein the mirror is adjacent to the second surface.

19. The three dimensional viewing assembly of claim 16, wherein the the mirror is disposed between the first and second surfaces.

20. The three dimensional viewing assembly of claim 14, wherein the beamsplitter is at least substantially flat.

* * * * *